United States Patent [19]

Howard

[11] Patent Number: 5,056,066
[45] Date of Patent: Oct. 8, 1991

[54] METHOD FOR ATTRIBUTE TRACKING IN SEISMIC DATA

[75] Inventor: Robert E. Howard, Houston, Tex.

[73] Assignee: Landmark Graphics Corporation, Houston, Tex.

[21] Appl. No.: 543,663

[22] Filed: Jun. 25, 1990

[51] Int. Cl.$^5$ ............................................. G01V 1/30
[52] U.S. Cl. ...................................... 367/72; 367/73; 364/421
[58] Field of Search ............................. 367/59, 72, 73; 364/421

[56] References Cited

U.S. PATENT DOCUMENTS 4,633,401 12/1986 Flinchbaugh ...................... 364/421

OTHER PUBLICATIONS

"Zoned Autopicking of Seismic Boosts CAEX", Valusek et al., *Oil & Gas Journal*, vol. 88,#9, 2/90.

*Primary Examiner*—Ian J. Lobo
*Attorney, Agent, or Firm*—Dodge, Bush, Moseley & Riddle

[57] ABSTRACT

A method for tracking seismic events such as boundaries of formation layers of earth formations is disclosed. Especially adapted for tracking such events in a two-dimensional slice of 3-D seismic volume data, the method begins by designating a starting data point on the seismic event. The method tracks such event through the grid of data by sequentially establishing areas or "tiles" of data about the starting point. The tiles are defined by data points of the grid. Each of the data points is then tested to see if it meets an acceptance criterion for the seismic event. Such data points of the tile are stored as identifying the seismic event only if certain of the data points of the tile pass the acceptance citerion. Next, each of the data points of a previously accepted tile are used as a starting data point about which a new tile is defined. The process is repeated until no more tiles are available for testing. The accepted data is then displayed so as to distinguish the accepted data from other data of the grid thereby identifying the seismic event to seismic interpretation specialists.

9 Claims, 3 Drawing Sheets

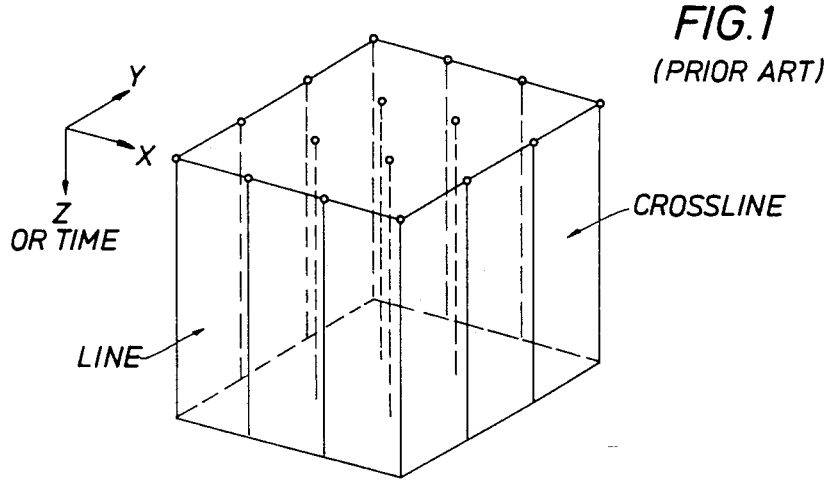
FIG.1 (PRIOR ART)
FIG.2 (PRIOR ART)
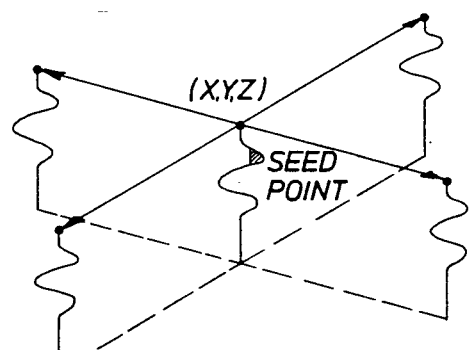
FIG.3 (PRIOR ART)
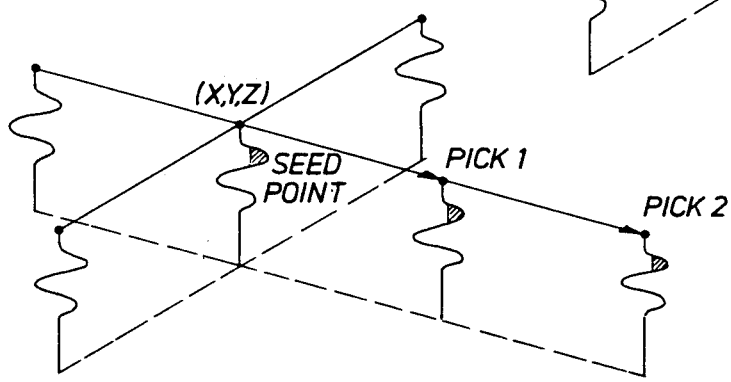
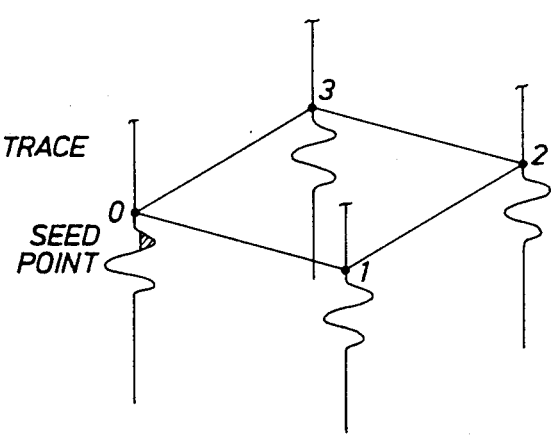
FIG.4 (PRIOR ART)
FIG.5

METHOD FOR ATTRIBUTE TRACKING IN SEISMIC DATA

BACGROUND OF THE INVENTION

1. Field of the Invention

This invention relates to the field of seismic data interpretation. In particular the invention relates to a machine process for selection of three-dimensional (3D) seismic data to provide petroleum exploration professionals more detailed understanding of subsurface geology and geometry. Still more particularly, this invention is an automated method of "picking" or "tracking" individual seismic events through a three-dimensional volume of data with extreme accuracy.

2. Description of the Prior Art

FIGS. 1 through 4 of the Drawings illustrate features and methods associated with the prior art picking methods; FIGS. 5 through 8 illustrate features and methods of the invention. Only FIGS. associated with prior art methods are introduced here.

FIG. 1 illustrates a portion of a hypothetical 3D seismic data volume in order to explain the three-dimensional relationships discussed in the text and accompanying drawings in this specification;

FIG. 2 is an isometric view of a portion of five seismic traces which illustrates the relationship between a "seed point" and its four adjacent traces;

FIG. 3 illustrates a prior art automatic tracking method; and

FIG. 4 illustrates a prior art "iterative" autotracking method.

FIG. 1 is an isometric view of a portion of a hypothetical three-dimensional (3D) seismic data volume. The circles at the top of the volume represent the surface location of individual traces. The vertical lines represent seismic traces which are measured in time or distance along the z-axis of the volume. Each individual trace is an amplitude versus time representation of an acoustic reflection from strata in the earth. A sequence of x versus time traces is called a "line" by seismic explorationists. A sequence of y versus time traces is called a "cross-line".

The horizontal section or time slice is a horizontal slice or plane through the 3D volume of data. An "horizon slice" is a slice along or parallel to a structurally interpreted horizon and hence along one bedding plane. Plotting of common amplitudes on x-y axes is similar to a surface topographic map, but of course such a plot is of subsurface strata. Plotting of such different amplitudes at a common subsurface depth illustrates different strata at common depths.

In less than ten years, computer aided exploration revolutionized seismic exploration and field development. Until recently, however, one aspect of seismic interpretation—picking subsurface horizons, or simply, "picking", remained essentially unchanged from paper and pencil method to automatic computer picking methods.

Traditionally, picking was done manually by drawing with colored pencils on paper, one seismic section or line at a time-an incredibly tedious process. In the early 1980's, interactive CAEX (an acronym for Computer Aided Exploration) workstations gave seismic explorationists the ability to pick 3D data more quickly and effectively. While interpreting seismic lines (that is, a two-dimensional vertical slice or a "vertical seismic section") was still accomplished by viewing and picking one line at a time, it could then be done by using a mouse in combination with a display screen and clicking the cursor on a few selected points along a horizon and letting the machine pick all the rest of the points on that line. This was the first type of automated picking, and represented an incremental increase in both productivity and accuracy over manual picking.

In one prior art automatic system for tracking a bedding plane (called an horizon) in a horizontal slice of 3D data, a user selected or "input" at least one "seed point", which then "expanded" in all four directions within the 3D data volume as illustrated in FIG. 2 until it reached the boundaries of a user specified zone. Users had the option of tracking seismic data in one of two modes.

A "seed point" is specified by its x and y location and its time or depth (i.e., the z-axis of FIG. 1). It is also specified by a characteristic of the reflection at that point. Such characteristic is usually the maximum amplitude of the reflection at that location in the volume of the data. Other characteristics, such as minimum amplitude, phase, frequency, etc., of the reflection at the x, y, z point may be used. As illustrated in FIG. 3 non-iterative tracking searched the seismic traces adjacent seed points for similar amplitude values, picked the best one, then proceeded to the next available trace without double-checking the accuracy of the pick.

An iterative picking mode verified an adjacent trace as a pick by cross-referencing the previous trace. Once verified, the adjacent trace was treated as a seed point and the picking of adjacent traces from it proceeded. FIG. 4 illustrates such prior art iterative picking. Verification means that if the amplitude of the picked trace is within the limits of tolerance set by the user, the pick is accepted. Users could specify (on a scale of 1–10) the degree of amplitude similarity they would allow. If a pick did not pass this acceptance test, it was designated "dead" until at least one directly adjacent trace matched sufficiently to accept it.

More specifically, once a seed point is selected on a trace, the trace is scanned up and down the z or time axis to find the local extrema amplitude or simply "extrema". A local extrema of a variable $x_i$ where i is a digitizing index, is defined as $$x_{i-1} < x_i \geq x_{i+1} \text{ or}$$

$$x_{i-1} > x_i \leq x_{i+1}.$$

Such scanning is bounded by zero crossings of the amplitude of the trace in the case of a peak or a trough. Such extrema will typically vary with time a small amount. For example, if $T_0$ represents the seed point, $T_1$ would typically represent the tim of the extrema. Next, the time $T_0$ is started on the target trace. On it, the time is varied up and down between zero crossings of its trace amplitude until the nearest extrema $T_2$ is found. Finally, the time $T_2$ is used on the trace on which the seed point exists and on such "seed" trace scanning up and down the "z" axis is again performed for the nearest extrema $T_3$. If $T_3$ equals $T_1$, then iterative tracking has been achieved and tracking continues.

The acceptance test tolerance of the prior art iterative tracking defined a function, $$S = \left| \frac{A_t - A_s}{A_t + A_s} \right| \text{where}$$

$A_t$ = Amplitude from the target trace at $T_2$, and
$A_s$ = Amplitude from the seed at $T_1$.

The value of S is bounded by values of 0 and 1. The more similar the two amplitudes, the closer the S function is to zero. The more dissimilar the two amplitudes, the closer the S function is to 1. Next, a score function is evaluated:

$$SCORE = (S*9.0) + 1.$$

The score is compared with a control value from 1 to 10 selected by the interpreter or user of the data. Scores greater than the control value prevent a target trace from being picked.

This iterative tracking mode and its associated acceptance test, while significantly more accurate than the non-iterative mode, was nevertheless unable to adequately pick horizons in areas with faults or discontinuities ("noise"). It had a tendency to jump off the original event in such areas of incoherent data, then "wander" from there, often propagating mis-picks all the way across a 3D survey.

The prior art methods of identifying similar seismic events in a 3D grid of seismic traces required only one neighboring point for verification. Under certain circumstances, picking errors slipped through. In practice, excessive correction and re-autotracking was required, or seismic interpreters couldn't use it in heavily faulted areas, the very areas where petroleum deposits may occur.

IDENTIFICATION OF THE OBJECTS OF THE INVENTION

A primary object of the invention is to provide a method for tracking seismic horizons in a 3D volume with much greater accuracy than prior art methods.

Another object of the invention is to provide a seismic, horizon tracking method which minimizes the time of interpreters in trying to correct "misties".

Still another object of the invention is to provide a method for tracking seismic horizons in a 3D volume which allows interpreters to discover and precisely delineate even small faults and discontinuities.

SUMMARY

The objects identified above as well as other advantages and features are provided in a method of tracking certain subterranean stratigraphic characteristics inferred from seismic traces. A time or horizontal slice of 3D seismic trace data defines an x-y grid of data points of which a seismic exploration specialist wants to map or identify all points having a common characteristic. Such characteristic may in numerical terms be the amplitude of a trace oscillation. In physical terms such amplitude may represent the boundary of a subterranean strata.

The process begins after certain seed points have been selected by the user. Region growing from such a seed point starts after a grid of three or more data points is defined. Such grid of data points, called a test area or "tile", includes the seed point and other test points in the grid which are to be tested to determine if they have the characteristic common with the seed point. In its broadest form, the invention stores each of the test data points as representative of the characteristic only if a test data point satisfies an acceptance test with respect to a numerical value of the seed point along at least two separate paths via imaginary links which define the test area.

In a preferred embodiment of the invention, the test area or tile is a grid of nine data points defined by a three-by-three array of points with the seed point at the center of the grid. Viewed another way, the tile is a composite area of four adjacent two-by-two grids, with each grid having the seed point at one corner. The preferred method requires that the data point diagonally opposite each of the two-by-two grids satisfy an acceptance test along two different paths. Each of such diagonally opposite points must satisfy the acceptance test in order for the entire three-by-three array to be accepted. Once a tile has been accepted, region growing through the entire 3D slice of data continues by treating each data point on the tile as a new seed point.

BRIEF DESCRIPTION OF THE DRAWINGS

As indicated above, FIGS. 1 through 4 illustrate prior art methods; the advantages and objects of the invention are described in FIGS. 5-8 of which, FIG. 5 illustrates a "tile" or test area according to the invention which includes four traces in a two-by-two trace grid in which a seed point is established at a corner of the tile and the entire tile is verified by verifying another point on the tile by two different paths;

DESCRIPTION OF THE INVENTION

Figure 6:
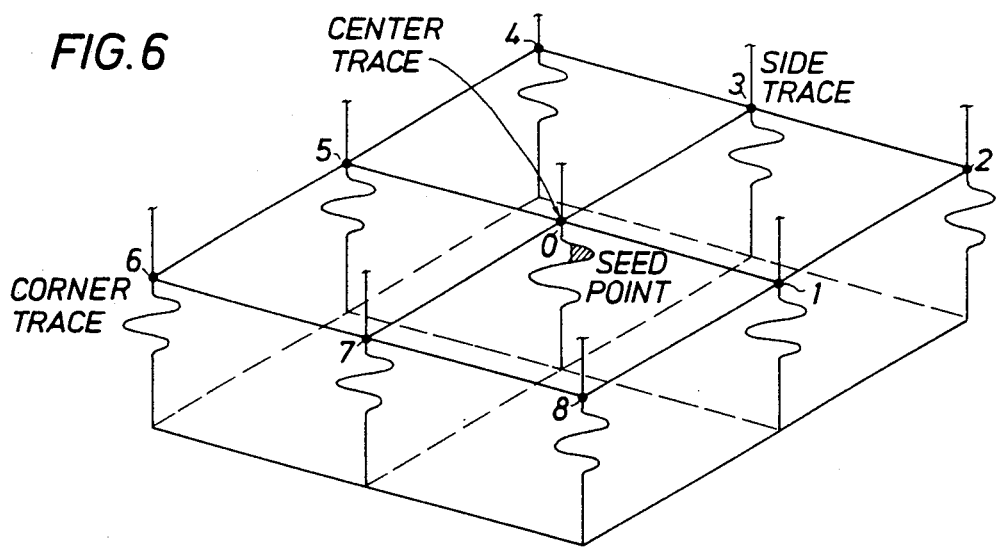
FIG. 6 illustrates a preferred "tile", or test area, as designated by the invention which includes nine traces in a rectilinear three-by-three trace grid about a center trace.

The autotracking process used by the invention begins when an interpreter manually inputs one or more seed points (or lines), indicating the seismic horizon he or she wishes to track through the 3D data volume.

In its broadest aspect, the method according to the invention is illustrated by reference to FIG. 5 where a user-specified seed point 0 is illustrated. In order to grow or expand through the 3D volume of data, a "tile" or area must be verified by an iterative method as described above by reference to FIG. 4. Each point of the tile defined by traces 0, 1, 2 and 3 is verified in turn. That is, point 1 is verified from points 0 to 1. Point 2 is verified from point 1 to point 2. Point 3 is verified from point 0 to point 3. Point 2 is again verified from point 3 to point 2. Of course, point 3 could be verified from point 2 to point 3 and from point 0 to point 3. Alternatively, verification could proceed from 0 to 1, 1 to 2, 2 to 3 and ultimately from 3 to 0.

Each trace or point on the tile must be iteratively verified in order for any one of them to be picked. Additionally, the entire tile is "picked" according to an "all or northing" rule. The "all or nothing" verification of the tile requires that at least one point in the tile be verified by two different paths around the tile. For example, if amplitude is selected as the verification characteristic for the tile, then the amplitude of point 1 compared with the amplitude of point 0 must be within a predetermined score of the control value selected by the user as described above by reference to prior art iterative method of FIG. 4. Point 2 as verified from point 1 to point 2 must also pass the acceptance test.

Next the above two steps are preformed first from point 0 to point 3 and then from point 3 to point 2. If and only if point 2 is verified via the alternative paths of 0-1; 1-2, and 0-3; 3-2 will any of the points 1, 2, 3 be selected by the method of region growing from seed point 0. Once selected, each of the other points will act as a seed point for a new tile. Each tile is tested according to the steps described above until there are no more seed points which can be tested.

The preferred embodiment of the method designates a nine—trace test area—or "tile"—around and including the seed point as illustrated in FIG. 6. Each tile consists of a center trace (with the seed point), four "side" traces (orthogonal to the center), and four "corner" traces (diagonal to the center). Unlike the iterative tracking mode of the prior art method—which required only one—to—one trace verification—the preferred embodiment of the invention picks and iteratively verifies all eight side and corner traces before any of them are accepted. If any comparison between two adjacent traces in the tile fails to pass a user-specified acceptance limit, all eight traces surrounding the seed point are rejected. In that case, autotracking can proceed only if another seed point has been input somewhere else in the 3D volume of data. Multiple seed points are typically selected for region growing in a 3D volume set.

Figure 7:
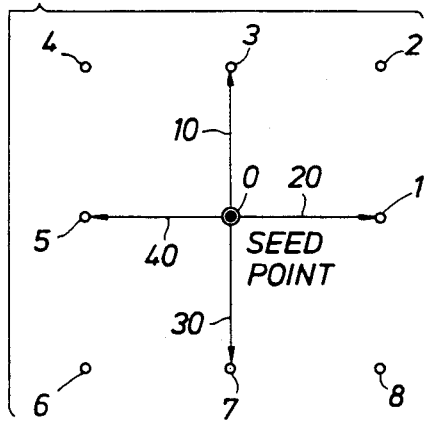
FIG. 7 illustrates the first step in autotracking using the preferred method of the invention where the seed point expands in all four directions within the 3D data volume and where four adjacent (side) traces are picked.
Figure 8:
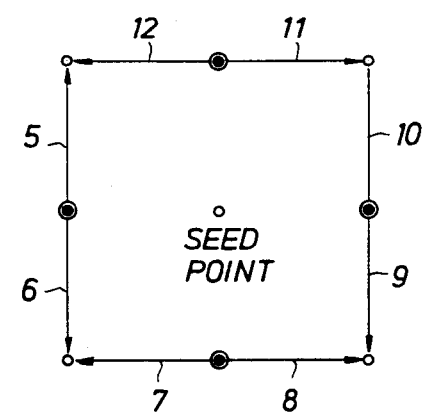
FIG. 8 illustrates the second step in autotracking with the tile of FIG. 6 where each corner trace is picked and verified by two independent routes, and then all eight trace points in the tile about the seed point are verified for accuracy before any of the eight trace points are accepted.

The method according to the invention steps through the multiple trace verification process in a single nine trace tile by first picking four adjacent (side) traces (see FIG. 7) and verifying each of the four points 1, 3, 5 and 7 in exactly the same way as the prior art iterative mode as indicated by FIG. 4. Next, as illustrated in FIG. 8 each corner trace is verified by two independent routes or links. For example, point 2 is iteratively verified via the link from 1 to 2 and from the link 3 to 2. Point 4 is iteratively verified via the link from 3 to 4 and from 5 to 4. Each iterative verification uses the same user-defined acceptance criteria as described above. All eight traces about the seed trace will be accepted only if all 12 paths or links in the tile pass the acceptance tests. When all 12 links pass these tests, any one of the eight traces 1–8 can be linked back to the seed point 0 by any possible route through the tile. This "all or nothing rule" insures that all nine points actually lie on the same seismic horizon.

The description above describes how a tile of points is verified and accepted about a seed point. In actual practice a user of the method specifies a boundary of data points about which picking is to be performed. Such boundary defines a search area. The user may specify many "seed" points about which the method is to be applied. Accordingly, there is provided, in the preferred embodiment of the invention, a method for defining which data points will have a new "tile" defined about it in order to continue region growing about original and new seed points.

A control array is first created so that the status of every point within the search area may be maintained at initialization. At initialization, each point is classified in one of three ways:
1. Picked: Used as a seed point from which expansion proceeds,
2. Virgin: Unpicked point for which tracking is possible, or
3. Dead: A point designated by the user as ineligible for tracking.

Multiple passes through each point in the control area search for a seed point. When a seed point is found, an attempt is made to expand about it, by means of the tile method described above, into adjacent "virgin" points.

If attempts at expanding into the adjacent points are successful (i.e., by the tile method described above), the tracked points are labelled "fresh" and the seed point is labelled "dead, but picked".

If the attempts are unsuccessful, the seed point is also labelled "dead, but picked", but the adjacent points remain unchanged. The tiling method starts again about the next available seed point.

When all points of the control array have been scanned, all points picked during the previous pass, now labelled "fresh", are relabelled "expand" and used as seed points on the next pass. Passes through the control area continue until no more "fresh" points are found.

A "pass" through the control array begins at a corner of the array and each point is searched until a "seed" or "expand" point is found. That point is expanded by the "tile" method described above. Scanning continues for each point adjacent the seed point.

When a seed (expand) point is found, it is placed at the center of a tile and the tile process as described above proceeds. Where two seed (expand) points are close to each other, expansion from each of such seed (expand) points may be to a common virgin point. The first seed point to test the virgin point determines its status. If the virgin point is on a successful tile, it is labelled "fresh". It will not be repicked, but will be used later in further testing to test the validity of other tiles.

Scanning continues in the control array. If no seed points are found, processing stops. If at least one seed point is found, all points labelled "fresh" are relabelled as "expand" and are used as seed points and the process is repeated.

Figure 9:
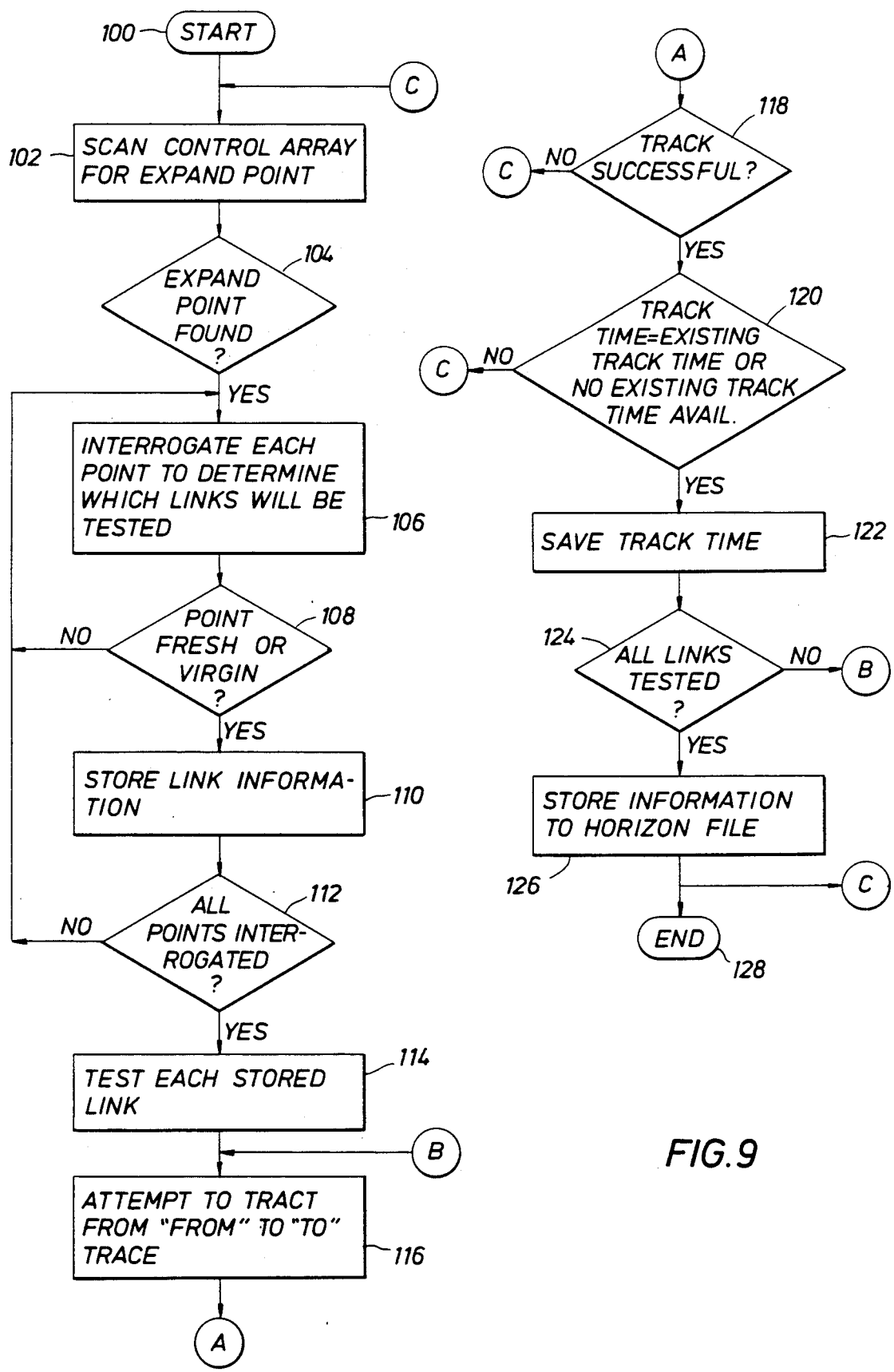
FIG. 9 illustrates a flow chart useful for programming the preferred nine trace tile method according to the invention.

FIG. 9 illustrates the preferred embodiment steps of the invention with a flow chart of process steps to be performed on a digital computer. The method steps are performed for a tile of points 0–8 as illustrated in FIG. 6.

A user defines the x-y extent of the 3D data to be searched. The user also provides a preselected grid of seed points representative of a characteristic of the 3D seismic data which is to be mapped or picked in the data.

As performed in a programmed digital computer, the method begins with logic box 100 for starting the method and then proceeds to logic box 102 where the test points of a tile—like those of FIG. 6—are defined. If the method is being started for the first time, each of the points 1–8 will be "virgin" points. On the other hand, if after a first tile has been found acceptable, each of the points 1–8 are selected as seed points and a new tile defined about each point. Links which have been previously accepted during the testing of points for a previous seed point are not re-tested. Similarly, dead links remain dead and "kill" any new tile of which they might be a part. A user may also specify points as dead; that is parts of the data may be specified which will not be searched.

Logic box 106 determines which links of a previously tested tile are to be tested. It receives feedback from logic blocks 108 and 112 to evaluate which links are to be tested. Link information defining "from" point and the "to" point are stored in logic box 110. Logic box 108 specifies whether a point is a fresh point never before having a tile defining it, a virgin point previously accepted, or a dead point.

Logic box 114 begins the test of each link of the tile, if not previously tested, from the "from" trace to the "to" trace. Actual testing of each link is done in logic box 116 and continues until all links are tested. Testing of a link is done by comparing a characteristic of the "from" trace to a corresponding characteristic of the "to" trace. For example, the amplitude of a reflection oscillation at a time (or depth) of the "to" trace can be required to be within a predetermined ratio of the amplitude of the "from" trace. Iterative tracking is required before a link is "tracked" successfully. That is, the "from" trace is also compared with the "to" trace. Iterative tracking and amplitude acceptance test procedures are the same as described above with reference to FIG. 4. Other characteristics can be used for testing of one trace to another. For example, phase, or frequency comparisons, or a mathematical correlation of one trace to another can be used if desired.

If the tracking from a "from" trace to a "to" trace in the process is unsuccessful, control is sent back to logic box 102 where the x-y grid is again scanned.

If tracking of a "from" trace to a "to" trace is successful in logic box 118, control is passed to logic box 120 where the track time for a link is compared with a predetermined time. If the tracking time is too large, control is again sent to logic box 102. Otherwise control is passed to logic box 122 for storing the track time for the previously tested link. Control is then passed to logic box 124 where a test is performed to determine if all links in the tile have been tested. If testing for a tile is not complete, control is passed again to logic box 116. If all links have been tested, the traces on the tile successfully tested are stored in an "horizon" file with traces or points designated as "picked" points if each and every link tested was successful according to the test routines illustrated by FIGS. 7 and 8.

Each picked trace then becomes a seed point and the process continues until no more seed points are available for testing in the x-y region of the 3D data volume. When a seed point is found, it is set at the center of a new tile to be tested and all points or traces on the tile are examined to determine which links need to be tested. If two or more tiles attempt to expand into the same "virgin" point, the first tile to be tested will test the virgin point. If a second tile fails to confirm that point, such point is then labelled "fresh" and will not be repicked but used later to test the validity of other tiles.

When the limits of the x-y array of data have been reached and no new seed points have been found, then the process stops. If at least one seed point is found, all traces which have been tracked (on the previous pass through the x-y data array) which were labelled "fresh" are relabelled "expand" or seed points and the tile region growing process is repeated.

Figure 10:
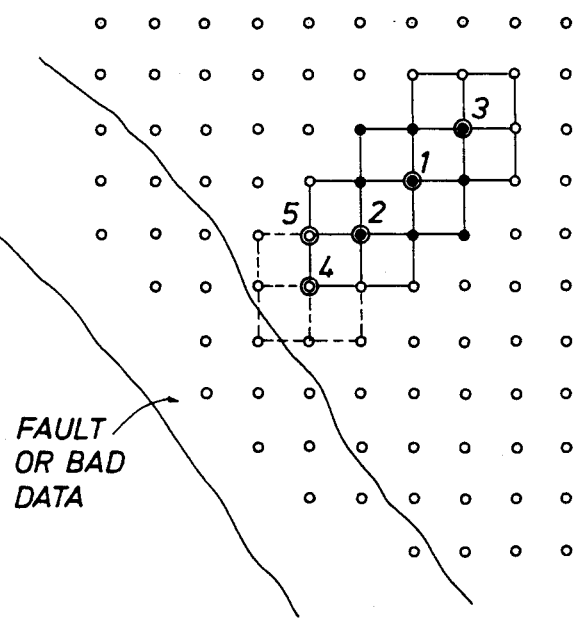
FIG. 10 illustrates the propagation of tiles to show how each trace accepted in one tile becomes the seed point of another tile, and how tiles rapidly expand until they reach a fault or area of bad data.

FIG. 10 illustrates how the tile region growing process according to the invention prevents expansion into fault data or noisy data on an x-y grid of data at a predetermined depth or time in a 3D volume of seismic traces. Tile 1 is successfully tested about seed point 1. Likewise, tiles about new seed points 2 and 3 are successfully tested. A tile defined about seed point 4 is unsuccessful because of the existence of a trace in its southwest corner which lies in a fault zone or is noisy data. Accordingly, none of the points of the tile about seed point 4 are picked, but some of them will be picked from other seed points during the region growing process.

Various modifications and alterations in the described methods and apparatus will be apparent to those skilled in the art of the foregoing description which does not depart from the spirit of the invention. For this reason, these changes are desired to be included in the appended claims. The appended claims recite the only limitation to the present invention. The descriptive manner which is employed for setting forth the embodiments should be interpreted as illustrative but not limitative.

What is claimed is:

1. A method of automatically selecting a horizon of earth formations from a three dimensional volume of seismic wavelet traces comprising the steps of,
   (a) designating a seed point at a depth of a wavelet of one of said seismic traces, said one seismic trace being designated a seed trace,
   (b) identifying a test volume of seismic traces including said seed trace and at least three other traces adjacent said seed trace and adjacent each other, said three other traces including two side traces and one diagonal trace, where said diagonal trace is disposed diagonally from said seed trace between said side traces,
   (c) determining that a local horizon exists through said seed point of said seed trace and depth points of said two side traces and said diagonal trace only if a depth point of a wavelet of one of said side traces or said diagonal trace is picked via at least two different paths from said seed trace, where a path includes one or more path links each including a starting trace to a target trace and picking for each path link is achieved where a characteristic of a wavelet of said target trace corresponds in depth to such characteristic of a wavelet of said starting trace,
   (d) storing each of said depth points of said two side traces and said diagonal trace only if it is determined that a horizon exists through said depth point of said seed trace and said other traces in step (c), and
   (e) using each of said depth points of said two side traces and said diagonal trace as a seed point of step (a) and repeating steps (b), (c) and (d).

2. The method of claim 1 wherein step (e) continues until no more local horizons exist through seed points which satisfy step (c) and wherein said method further comprises the step of displaying said stored depth points in a graphical format which identifies the depth of said characteristic of said seismic wavelet as a function of x-y dimensions of said three dimensional volume of traces.

3. The method of claim 1 wherein each target trace is iteratively picked along said path link with respect to a starting trace.

4. The method of claim 3 wherein a target trace is iteratively picked along said path link with respect to a starting trace including the steps of, (i) recording a numerical value of said characteristic of a starting wavelet at a starting depth point of said starting wavelet, (ii) transferring the depth of said starting depth point to said target trace and finding the closest depth point of said characteristic of the wavelet of said target that exists between zero crossings of said target trace and recording said depth point and a numerical value of said characteristic of said target trace wavelet, and (iii) transferring the depth of said depth point of said target trace back to said beginning trace to determine if it is between zero crossings of said wavelet of said starting trace, and if it is, (iv) requiring that the difference between said numerical value of said characteristic of said starting trace wavelet and said numerical value of said characteristic of said target wavelet be within a predetermined numerical amount.

5. A method of automatically selecting a horizon of earth formations from a three dimensional volume of seismic wavelet traces comprising the steps of, (a) designating a seed point at a depth of a wavelet of one of said seismic traces, said one seismic trace being designated a seed trace, (b) identifying a test volume of seismic traces including said seed trace and at least eight other traces adjacent said seed trace, said eight other traces including four side traces and four diagonal traces, (c) determining that a local horizon exists through said seed point of said seed trace and depth points of said eight traces only if a depth point of a wavelet of one of each of said four diagonal traces is picked via at least two different paths from said seed trace, where a path includes one or more path links, each path link being defined from a starting trace to a target trace and picking is achieved where a characteristic of a wavelet of said target trace corresponds in depth to such characteristic of a wavelet of said starting trace, (d) storing each of said depth points of said eight traces only if it is determined that a local horizon exists through said depth point of said seed trace and said eight traces in step (c), and (e) using each of said depth points of said eight traces which has not been used as a seed point before as a seed point of step (a) and repeating steps (b), (c) and (d).

6. The method of claim 5 wherein step (e) continues until no more local horizons exist through seed points which satisfy step (c) and wherein said method further comprises the step of displaying said stored depth points in a graphical format which identifies the depth of said characteristic of said seismic wavelet as a function of x-y dimensions of said three dimensional volume of traces.

7. The method of claim 5 wherein each target trace is iteratively picked along said path link with respect to a starting trace.

8. The method of claim 7 wherein a target trace is iteratively picked along said path link with respect to a starting trace including the steps of, (i) recording a numerical value of said characteristic of a starting wavelet at a starting depth point of said starting wavelet, (ii) transferring the depth of said starting depth point to said target trace and finding the closest depth point of said characteristic of the wavelet of said target that exists between zero crossings of said target trace and recording said depth point and a numerical value of said characteristic of said target trace wavelet, and (iii) transferring the depth of said depth point of said target trace back to said beginning trace to determine if it is between zero crossings of said wavelet of said starting trace, and if it is, (iv) requiring that the difference between said numerical value of said characteristic of said starting trace wavelet and said numerical value of said characteristic of said target wavelet be within a predetermined numerical amount.

9. A method of displaying a representation of a boundary between layers of earth formations comprising the steps of, (a) collecting seismic reflection data of said earth formations and storing such data in a computer memory as a volume of seismic traces each including a plurality of seismic wavelets, (b) selecting a seed point at a seed depth of at least one of said seismic traces designated as a seed trace, where said seed depth is the depth of a characteristic of a wavelet of said seed trace, (c) selecting a test volume of seismic traces of which said seed trace is one such trace, (d) determining that a local horizon exists through said seed point of said seed trace and depth points of all other traces in said test volume only if one or more wavelets of the test traces other than said seed trace is picked with respect to said wavelet of said seed point of said seed trace along two different paths from said seed trace, where a path includes one or more path links from one seed point of a starting trace to a target trace and picking is achieved where a characteristic of a wavelet of said target trace corresponds in depth to such characteristic of a wavelet of said starting trace, (e) storing each of said depth points only if it is determined that a local horizon exists through said depth point of said seed trace and said other traces of said test volume in step (d), and (f) using each of said depth points of said all other traces in said test volume as a seed point of step (b) and repeating steps (c), (d), and (e), and (g) displaying said stored depth points in a graphical format which identifies the depth of said characteristic as a function of x-y dimensions of said volume of seismic traces.

* * * * *